(12) United States Patent
Choi et al.

(10) Patent No.: US 11,634,115 B2
(45) Date of Patent: Apr. 25, 2023

(54) CONTROL DEVICE AND METHOD FOR HYBRID ELECTRIC VEHICLE

(71) Applicants: Hyundai Motor Company, Seoul (KR); Kia Motors Corporation, Seoul (KR)

(72) Inventors: Jae Young Choi, Seoul (KR); Gwang Il Du, Incheon (KR); Hoon Han, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 341 days.

(21) Appl. No.: 17/035,177

(22) Filed: Sep. 28, 2020

(65) Prior Publication Data

US 2021/0380094 A1 Dec. 9, 2021

(30) Foreign Application Priority Data

Jun. 8, 2020 (KR) ........................ 10-2020-0069016

(51) Int. Cl.
*B60W 30/14* (2006.01)
*B60W 20/15* (2016.01)
*B60W 40/105* (2012.01)
*B60W 10/18* (2012.01)
*B60W 10/08* (2006.01)
*B60W 30/18* (2012.01)

(52) U.S. Cl.
CPC ............ *B60W 20/15* (2016.01); *B60W 10/08* (2013.01); *B60W 10/18* (2013.01); *B60W 30/143* (2013.01); *B60W 30/18127* (2013.01); *B60W 40/105* (2013.01); *B60W 2520/00* (2013.01)

(58) Field of Classification Search
CPC ...... B60W 20/15; B60W 10/08; B60W 10/18; B60W 30/143; B60W 30/18127; B60W 40/105; B60W 2520/00; B60W 2552/15; B60W 10/184; B60W 2520/10; B60W 2710/083; B60W 2710/182; B60W 2720/10; B60W 40/076; B60W 30/16; B60K 6/442; B60Y 2300/89; B60Y 2200/92; B60Y 2300/18125; Y02T 10/62
USPC .............................................. 701/22, 70, 78
See application file for complete search history.

(56) References Cited

U.S. PATENT DOCUMENTS 4,039,061 A * 8/1977 Pruvot ................... F16H 61/21
                                              192/220
6,029,107 A * 2/2000 Sato ........................ F16H 59/66
                                              477/901

(Continued)

*Primary Examiner* — B M M Hannan
(74) *Attorney, Agent, or Firm* — Morgan, Lewis & Bockius LLP (57) ABSTRACT

The present invention relates to a control device and method of a hybrid electric vehicle (HEV) to which Downhill Brake Control (DBC) is applied, and determines whether to perform a braking control of the HEV, by comparing a current vehicle speed of the HEV with a target vehicle speed of the HEV upon operating a DBC function, calculates a braking demand amount based on a difference between the current vehicle speed and the target vehicle speed when the braking control is determined, and controls a vehicle speed of the HEV by determining whether to perform cooperative control of a regenerative braking and a brake hydraulic braking, based on the braking demand amount and a maximum regenerative braking possible amount.

17 Claims, 5 Drawing Sheets

(56) References Cited

U.S. PATENT DOCUMENTS

| | | | | |
|---|---|---|---|---|
| 6,070,118 A * | 5/2000 | Ohta | G01C 21/26 | 701/56 |
| 6,095,942 A * | 8/2000 | Yamaguchi | F16H 61/66259 | 477/901 |
| 6,427,108 B1 * | 7/2002 | Kanasugi | B60K 28/165 | 477/118 |
| 9,493,160 B2 * | 11/2016 | Kelly | B60W 10/119 | |
| 9,908,528 B2 * | 3/2018 | Kelly | B60W 30/143 | |
| 11,230,288 B1 * | 1/2022 | Tokarz | B60W 20/40 | |
| 2002/0107106 A1 * | 8/2002 | Kato | F02D 31/001 | 477/181 |
| 2005/0125137 A1 * | 6/2005 | Shiiba | B60K 31/0008 | 340/436 |
| 2006/0049691 A1 * | 3/2006 | Deprez | B60W 10/182 | 303/191 |
| 2006/0149450 A1 * | 7/2006 | Taffin | F16H 61/0213 | 701/56 |
| 2007/0255477 A1 * | 11/2007 | Okuda | B60K 6/442 | 701/93 |
| 2009/0159351 A1 * | 6/2009 | Ando | B60L 58/25 | 180/65.265 |
| 2010/0217469 A1 * | 8/2010 | Bach | B60T 7/122 | 701/31.4 |
| 2011/0270497 A1 * | 11/2011 | Uematsu | B60T 8/175 | 701/50 |
| 2013/0066493 A1 * | 3/2013 | Martin | B60W 10/06 | 180/65.265 |
| 2014/0066251 A1 * | 3/2014 | Kawamoto | B60W 20/30 | 180/65.265 |
| 2015/0191170 A1 * | 7/2015 | Johansson | B60T 7/12 | 701/94 |
| 2015/0203117 A1 * | 7/2015 | Kelly | F16H 61/0213 | 701/91 |
| 2016/0101780 A1 * | 4/2016 | Park | B60W 50/14 | 701/70 |
| 2017/0088117 A1 * | 3/2017 | Ogawa | B60L 58/15 | |
| 2017/0144650 A1 * | 5/2017 | Nagami | B60K 6/22 | |
| 2018/0128672 A1 * | 5/2018 | Park | F16H 59/52 | |
| 2018/0148063 A1 * | 5/2018 | Tatsushiro | B60W 30/18009 | |
| 2018/0170386 A1 * | 6/2018 | Jung | B60L 7/18 | |
| 2018/0201140 A1 * | 7/2018 | Shimizu | B60T 1/10 | |
| 2018/0319397 A1 * | 11/2018 | Ohta | B60W 30/143 | |
| 2019/0126759 A1 * | 5/2019 | Miller | B60L 15/2009 | |
| 2019/0161069 A1 * | 5/2019 | Yui | B60L 50/61 | |
| 2019/0359213 A1 * | 11/2019 | Huh | B60W 50/0097 | |
| 2019/0381894 A1 * | 12/2019 | Kujubu | B60L 15/2018 | |
| 2019/0381982 A1 * | 12/2019 | Bull | B60T 8/96 | |
| 2020/0130667 A1 * | 4/2020 | Bull | B60T 7/042 | |
| 2020/0156643 A1 * | 5/2020 | Hu | F02D 41/0007 | |
| 2020/0164885 A1 * | 5/2020 | Kujubu | H02P 3/14 | |
| 2020/0369156 A1 * | 11/2020 | Moon | B60L 7/18 | |
| 2021/0171041 A1 * | 6/2021 | Son | B60L 7/26 | |

* cited by examiner

CONTROL DEVICE AND METHOD FOR HYBRID ELECTRIC VEHICLE

CROSS-REFERENCE TO RELATED APPLICATION

The present application claims priority to Korean Patent Application No. 10-2020-0069016, filed on Jun. 8, 2020, the entire contents of which is incorporated herein for all purposes by this reference.

BACKGROUND OF THE INVENTION

Field of the Invention

The present invention relates to a control device and method of a hybrid electric vehicle (HEV) to which Downhill Brake Control (DBC) is applied.

Description of Related art

As various vehicle types are hybridized, DBC is also being applied to HEVs. The DBC automatically enables low-speed driving of about 10 km/h even when a driver does not operate a brake pedal on a steep downhill. Like the conventional gasoline and diesel vehicles, the DBC also performs vehicle speed control in a HEV, using only the brake hydraulic pressure.

As compared to the conventional gasoline and diesel vehicles, the HEV has poor brake capacity and cooling performance. When the braking is operated with only the brake hydraulic pressure upon operating the DBC in the HEV, the brake hydraulic braking amount and frequency of use increase as compared to the conventional HEV, thereby deteriorating the durability of the brake hardware (H/W).

The information disclosed in this Background of the present invention section is only for enhancement of understanding of the general background of the present invention and may not be taken as an acknowledgement or any form of suggestion that this information forms the prior art already known to a person skilled in the art

BRIEF SUMMARY

Various aspects of the present invention are directed to providing a control device and method of a HEV which may improve fuel efficiency and brake durability through the cooperative control of regenerative braking and brake hydraulic braking when the DBC is operated.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a control device of a hybrid electric vehicle (HEV) includes a processor and storage storing instructions executed by the processor. The processor is configured to determine whether to perform a braking control of the HEV, by comparing a current vehicle speed of the HEV with a target vehicle speed of the HEV upon operating a Downhill Brake Control (DBC) function, to calculate a braking demand amount based on a difference between the current vehicle speed and the target vehicle speed when the braking control is determined, and to control a vehicle speed of the HEV by determining whether to perform cooperative control of a regenerative braking and a brake hydraulic braking, based on the braking demand amount and a maximum regenerative braking possible amount.

The processor determines whether it is possible to follow the target vehicle speed by using only the regenerative braking, by comparing the braking demand amount and the maximum regenerative braking possible amount.

The processor determines regenerative braking single control by determining whether it is possible for the vehicle speed to reach to the target vehicle speed by using only the regenerative braking, when the braking demand amount is less than the maximum regenerative braking possible amount.

The processor controls output torque of a motor by calculating regenerative braking torque corresponding to the braking demand amount.

The processor determines the cooperative control of the regenerative braking and the brake hydraulic braking by determining whether it is impossible to follow the target vehicle speed by using only the regenerative braking, when the braking demand amount is not less than the maximum regenerative braking possible amount.

The processor calculates a brake hydraulic braking demand amount by subtracting the maximum regenerative braking possible amount from the braking demand amount and controls output torque of a brake by adjusting a brake hydraulic pressure based on the brake hydraulic braking demand amount.

The processor controls output torque of a motor by calculating regenerative braking torque corresponding to the maximum regenerative braking possible amount.

The processor determines to perform the braking control when the difference between the current vehicle speed and the target vehicle speed is not less than a reference vehicle speed.

According to various aspects of the present invention, a method for controlling a HEV includes determining whether to perform a braking control of the HEV, by comparing a current vehicle speed of the HEV with a target vehicle speed of the HEV upon operating a DBC function, calculating a braking demand amount based on a difference between the current vehicle speed and the target vehicle speed when the braking control is determined, and controlling a vehicle speed of the HEV by determining whether to perform cooperative control of a regenerative braking and a brake hydraulic braking, based on the braking demand amount and a maximum regenerative braking possible amount.

The controlling of the vehicle speed includes determining whether it is possible for the vehicle speed to reach to the target vehicle speed by using only the regenerative braking, by comparing the braking demand amount and the maximum regenerative braking possible amount.

The controlling of the vehicle speed further includes determining a regenerative braking single control by determining whether it is possible for the vehicle speed to reach to the target vehicle speed by using only the regenerative braking, when the braking demand amount is less than the maximum regenerative braking possible amount.

The controlling of the vehicle speed further includes controlling an output torque of the motor by calculating regenerative braking torque corresponding to the braking demand amount.

The controlling of the vehicle speed further includes determining the cooperative control of the regenerative braking and the brake hydraulic braking by determining whether it is impossible to follow the target vehicle speed by using only the regenerative braking, when the braking demand amount is not less than the maximum regenerative braking possible amount.

The controlling of the vehicle speed further includes calculating a brake hydraulic braking demand amount by subtracting the maximum regenerative braking possible amount from the braking demand amount and controlling output torque of a brake by adjusting a brake hydraulic pressure based on the brake hydraulic braking demand amount.

The controlling of the vehicle speed further includes controlling an output torque of the motor by calculating regenerative braking torque corresponding to the maximum regenerative braking possible amount.

The determining of whether to perform the braking control includes determining to perform the braking control when the difference between the current vehicle speed and the target vehicle speed is not less than a reference vehicle speed.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
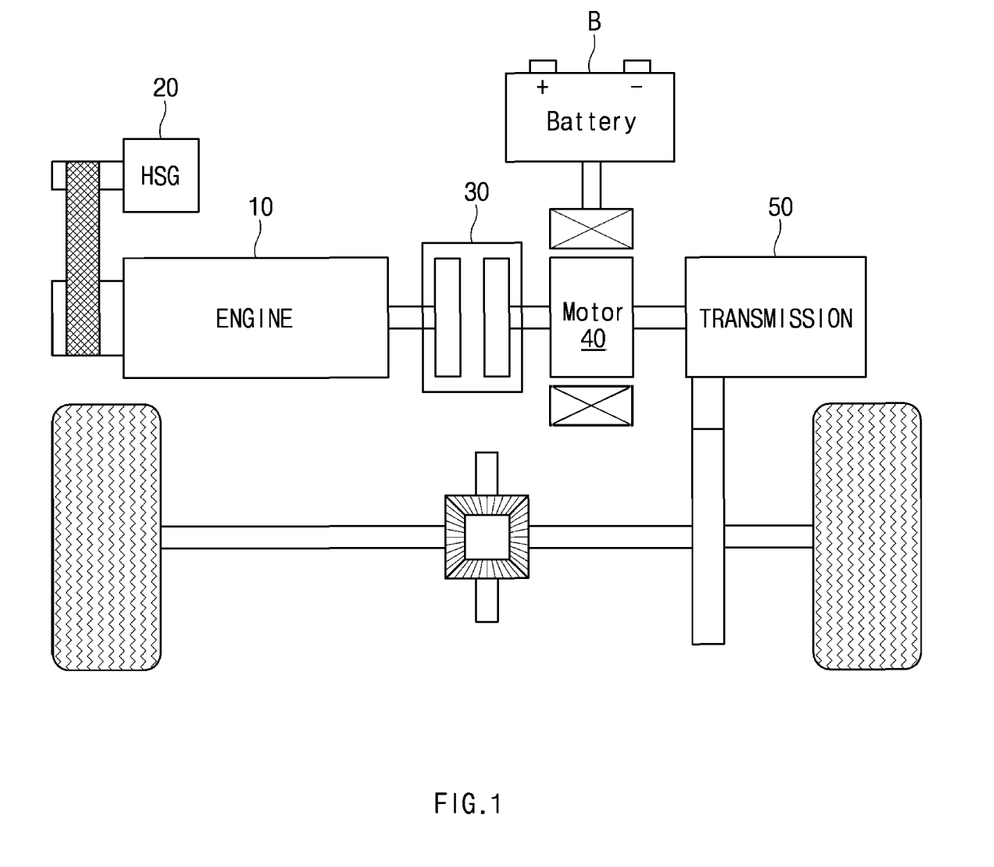
FIG. 1 is a block diagram illustrating a HEV associated with the present invention.

FIG. 1 is a block diagram illustrating a HEV associated with the present invention.

Referring to FIG. 1, the HEV includes an engine 10, a hybrid starter generator (HSG) 20, an engine clutch 30, a motor 40, and a transmission 50.

The engine 10 combusts fuel to generate power (engine torque) required to drive a vehicle. Various engines known as a gasoline engine, a diesel engine, or the like may be used as the engine 10. The engine 10 controls the output torque (i.e., an engine torque) depending on the command of the engine management system (EMS).

The HSG 20 may be mounted on the engine 10 and may start by cranking the engine 10. The HSG 20 may generate electric energy by operating as a generator in a state where the engine 10 is started. The electrical energy generated by the HSG 20 may be used to charge a battery 'B'.

The engine clutch 30 is located between the engine 10 and the motor 40 to engage or disengage the power (output torque) of the engine 10. The engine clutch 30 delivers or blocks the power (engine torque) generated by the engine 10 to the driving wheel (vehicle wheel) through engagement or disengagement.

The motor 40 receives power from a battery 'B' to generate power (motor power) and then delivers the motor power to the driving wheel. The motor 40 controls the output torque (motor torque) of the motor 40 by changing the rotation direction and revolutions per minute (RPM) depending on the instructions of the motor control unit (MCU). The motor 40 may be used as a generator that charges the battery 'B' by generating reverse electromotive force when state of charge (SOC) is insufficient or during regenerative braking. The battery 'B' supplies the power required to drive the vehicle, and is implemented with a high voltage battery. A power converter may be located between the motor 40 and the battery 'B'. The power converter converts and supplies the voltage output from a vehicle battery into a motor driving voltage. The battery 'B' may be charged by the regenerative energy generated by the motor 40.

The transmission 50 converts and outputs the motor torque or the engine torque and the motor torque at the transmission ratio matched with a shifting gear (gear). The transmission 50 may be implemented with a double clutch transmission (DCT). The transmission 50 changes the shifting gear depending on the instructions of a Transmission Control Unit (TCU). The TCU may determine an optimal shifting gear based on information related to a vehicle's driving speed (i.e., a vehicle speed or a wheel speed), accelerator pedal position, engine rotation speed, and/or clutch travel, through sensors in the vehicle.

Figure 2:
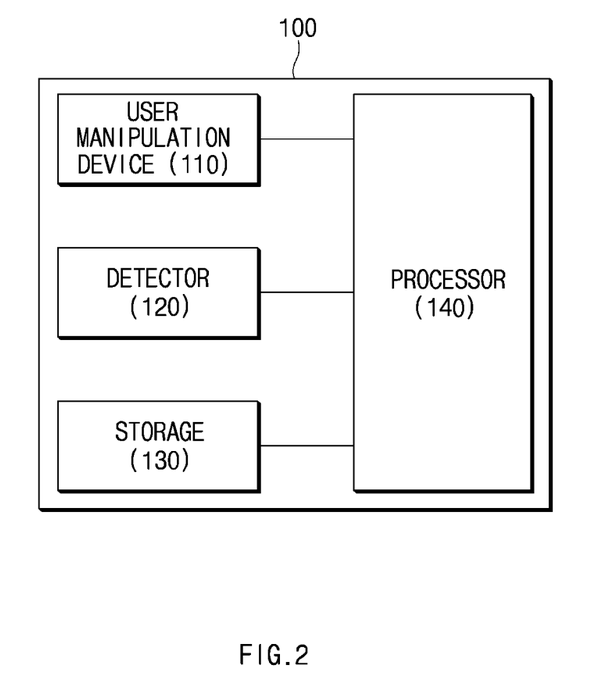
FIG. 2 is a block diagram illustrating a control device of a HEV according to various exemplary embodiments of the present invention.
Figure 3:
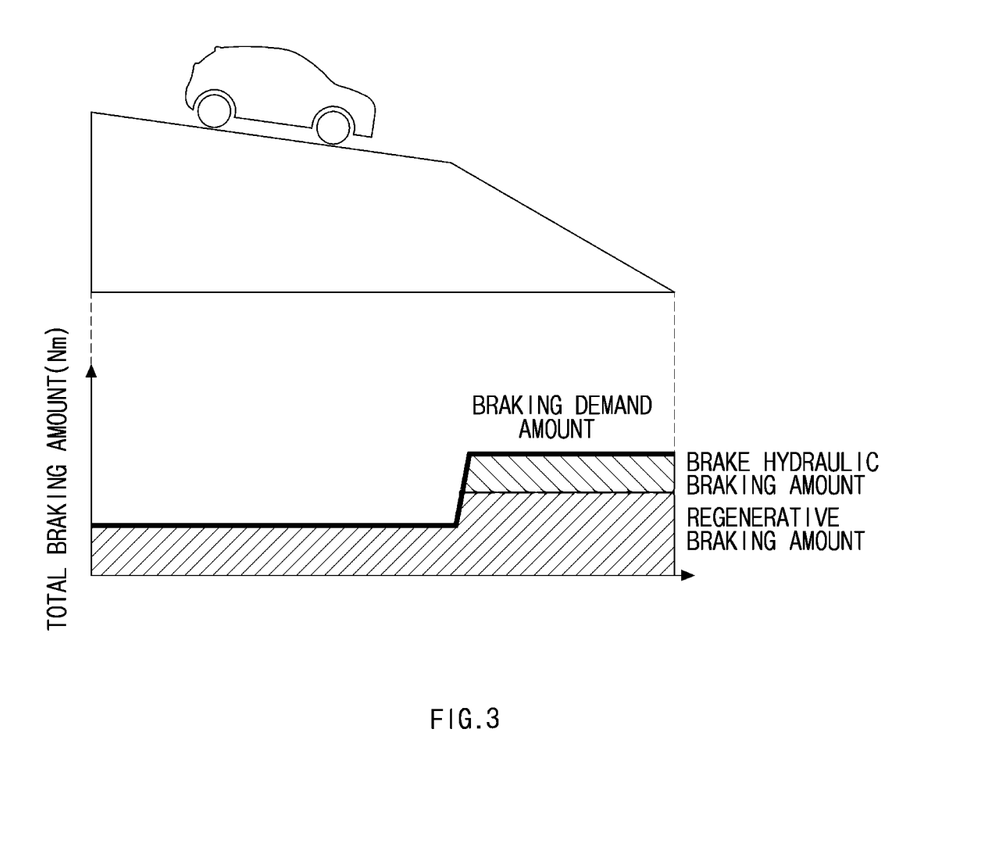
FIG. 3 is a view for describing a braking method according to various exemplary embodiments of the present invention.

FIG. 2 is a block diagram illustrating a control device of a HEV according to various exemplary embodiments of the present invention. FIG. 3 is a view for describing a braking method according to various exemplary embodiments of the present invention. Herein, the HEV is a vehicle to which a DBC function is applied.

Referring to FIG. 2, a control device 100 of a HEV (hereinafter, a vehicle) may include a user manipulation device 110, a detector 120, storage 130, and a processor 140, which are connected through a vehicle network. Herein, the vehicle network is implemented with Controller Area Network (CAN), a Media Oriented Systems Transport (MOST) network, Local Interconnect Network (LIN), Ethernet, and/or X-by-Wire (Flexray).

The user manipulation device 110 may generate data depending on the manipulation of a user (e.g., a driver). For example, when a DBC manipulation button is entered by the user, the user manipulation device 110 may generate data for turning on or off the DBC function. The user manipulation device may be implemented with a button, a switch, a dial, a touch pad, and/or a touch screen. The user manipulation device 110 is disposed on a steering wheel, a dashboard, a center fascia, and/or a door trim.

The detector 120 obtains vehicle information from at least one sensor or electric control unit (ECU), which are mounted in the vehicle. The detector 120 may obtain a current speed (hereinafter, a current vehicle speed) and acceleration (deceleration) of the vehicle through a wheel speed sensor, an acceleration sensor, and the like. The detector 120 may measure the slope of a road on which the vehicle is located, using an acceleration sensor, a laser sensor, an image sensor, or the like. The detector 120 may obtain (measure) the braking intent by a user, that is, a braking demand amount, using a brake pedal sensor (BPS).

The storage 130 may be a non-transitory storage medium that stores instructions executed by the processor 140. The storage 130 may be implemented with at least one of storage media (recording media), such as a flash memory, a hard disk, a Secure Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a removable disc, and the like.

The storage 130 may store a lookup table in which a target vehicle speed (hereinafter, a target vehicle speed) for each gear is defined under the condition that the DBC is operated. The storage 130 may store a target vehicle speed set by the user. The storage 130 may store input data and output data according to the operation of the processor 140; alternatively, the storage 130 may store preset configuration information set by the user or a system designer.

The processor 140 controls the overall operation of the control device 100. The processor 140 may be implemented with at least one of an Application Specific Integrated Circuit (ASIC), a Digital Signal Processor (DSP), a Programmable Logic Devices (PLD), Field Programmable Gate Arrays (FPGAs), a Central Processing Unit (CPU), a microcontroller, and a microprocessor.

The processor 140 may initiate the operation of the DBC function depending on a user input received from the user manipulation device 110. When receiving data for turning on the DBC function from the user manipulation device 110, the processor 140 operates the DBC function. Various exemplary embodiments of the present invention is exemplified as the DBC function is operated depending on the user input, but is not limited thereto. Various exemplary embodiments of the present invention may be implemented to determine whether to operate the DBC function, in consideration of the slope of a road, on which the vehicle is located, and the current vehicle speed.

The processor 140 identifies the current vehicle speed and the target vehicle speed when the operation of the DBC function is started. The processor 140 may obtain the current vehicle speed through the detector 120. The processor 140 may select the target vehicle speed under a DBC operating condition. The processor 140 identifies the gear (shifting gear) upon operating the DBC function and may select the target vehicle speed with reference to the lookup table stored in the storage 130, based on the identified gear. Moreover, the processor 140 may access the target vehicle speed set by the user.

The processor 140 may determine whether to perform braking control, based on the difference between the current vehicle speed and the target vehicle speed. The processor 140 determines whether the speed difference between the current vehicle speed and the target vehicle speed is not less than the reference vehicle speed (hereinafter referred to as a "reference vehicle speed"). Here, the speed difference is the value obtained by subtracting the target vehicle speed from the current vehicle speed. The processor 140 determines to perform the braking control when the speed difference between the current vehicle speed and the target vehicle speed is not less than the reference vehicle speed; the processor 140 determines not to perform the braking control when the speed difference between the current vehicle speed and the target vehicle speed is less than the reference vehicle speed. The processor 140 terminates the DBC function when it is determined that the braking control is not performed.

The processor 140 calculates the braking demand amount required due to the difference between the current vehicle speed and the target vehicle speed when it is determined that the braking control is performed. In other words, the processor 140 calculates the braking demand amount required for braking to follow the target vehicle speed, based on the speed difference between the current vehicle speed and the target vehicle speed when the difference between the current vehicle speed and the target vehicle speed is not than the reference vehicle speed. The processor 140 calculates the braking demand amount in consideration of not only the speed difference between the current vehicle speed and the target vehicle speed, but also the slope of the road, when calculating the braking demand amount. Also, the processor 140 may also calculate the maximum regenerative braking possible amount, based on the speed difference between the current vehicle speed and the target vehicle speed, the slope of a road, and the like.

The processor 140 may determine whether the calculated braking demand amount is less than the maximum regenerative braking possible amount, to determine whether to control the cooperation of the regenerative braking and the brake hydraulic braking. The processor 140 determines that it is possible to follow the target vehicle speed by only the regenerative braking when the braking demand amount is less than the maximum regenerative braking possible amount, and then may determine the single control (i.e., the cooperative control of the regenerative braking and the brake hydraulic braking is not implemented) of the regenerative braking. In the meantime, the processor 140 determines that it is impossible to follow the target vehicle speed by only the regenerative braking when the braking demand amount is not less than the maximum regenerative braking possible amount, and then may determine to perform the cooperative control of the regenerative braking and the brake hydraulic braking.

When the calculated braking demand amount is less than the maximum regenerative braking possible amount, the processor 140 performs to follow the target vehicle speed, using the only regenerative braking. When the single control of the regenerative braking is determined, the processor 140 turns off the brake hydraulic braking and follows the target vehicle speed through the only regenerative braking. The processor 140 determines the regenerative braking torque corresponding to the braking demand amount, and controls the output torque (motor torque) of the motor 40 based on the determined braking torque. The processor 140 may monitor motor torque control for the regenerative braking via CAN communication.

When the calculated braking demand amount is not less than the maximum regenerative braking possible amount, the processor 140 performs target vehicle speed tracking through the cooperation control of the regenerative braking and the brake hydraulic braking. The processor 140 controls the output torque of the motor 40 by calculating the regenerative braking torque corresponding to the maximum regenerative braking possible amount. Besides, the processor 140 determines the brake hydraulic braking demand amount, based on the braking demand amount and the maximum regenerative braking possible amount. The brake hydraulic braking demand amount may be calculated because the maximum regenerative braking possible amount is subtracted from the braking demand amount. The processor 140 may control the brake torque by adjusting the brake hydraulic pressure based on the brake hydraulic braking demand amount.

The processor 140 may determine the ratio of the regenerative braking possible amount and the brake hydraulic braking demand amount, based on the braking demand amount. For example, assuming that the ratio of the braking demand amount is 100%, when the sum of the ratio of the regenerative braking possible amount and the ratio of the brake hydraulic braking demand amount is equal to the ratio of the braking demand amount, the ratio of the regenerative braking possible amount and the brake hydraulic braking demand amount may be defined as 'regenerative braking possible amount brake hydraulic braking demand amount=A:B'. At the instant time, the 'A' ratio may not exceed the maximum regenerative braking possible amount. Herein, 'A' denotes [(maximum regenerative braking possible amount)/(braking demand amount)]%; 'B' denotes [(braking demand amount)−(maximum regenerative braking possible amount)/(braking demand amount)]%.

According to the exemplary embodiment of the present invention, when the braking demand amount for DBC occurs, as illustrated in FIG. 3, the vehicle speed is controlled by generating the maximum regenerative braking amount preferentially through the regenerative braking; the vehicle speed is controlled through the braking hydraulic braking with respect to the remaining braking demand amount obtained by subtracting the maximum regenerative braking amount from the braking demand amount. Accordingly, the high-voltage battery 'B' may be charged using the electric energy generated by regenerative braking during DBC operation, and thus the fuel efficiency may be improved by increasing the vehicle's travelable range (distance to empty) and brake durability may be improved by reducing the brake hydraulic brake amount and frequency of use.

Figure 4:
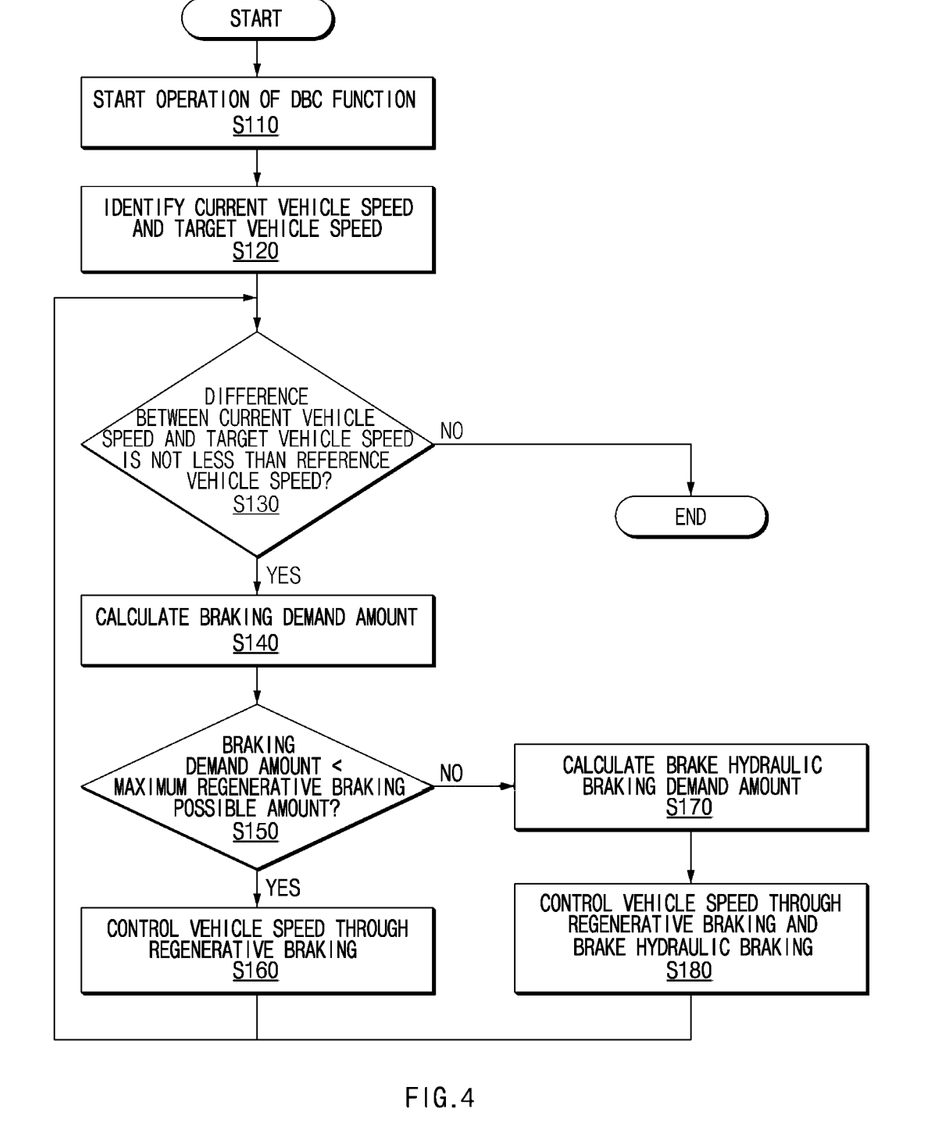
FIG. 4 is a flowchart illustrating a method of controlling a HEV according to various exemplary embodiments of the present invention.

FIG. 4 is a flowchart illustrating a method of controlling a HEV according to various exemplary embodiments of the present invention.

Referring to FIG. 4, the processor 140 starts the operation of a DBC function (S110). The processor 140 operates the DBC function when receiving a command for instructing to turn on the DBC function from the user manipulation device 110.

The processor 140 identifies a current vehicle speed and a target vehicle speed when the operation of the DBC function is started (S120). The processor 140 may detect the current vehicle speed through a sensor. The processor 140 may identify a gear at the time of operating the DBC function and may determine the target vehicle speed (e.g., 10 kph) with reference to a lookup table stored in the storage 130, based on the identified gear. Moreover, the processor 140 may identify the target vehicle speed set by a user.

The processor 140 determines whether a difference (speed difference) between the current vehicle speed and the target vehicle speed is not less than a reference vehicle speed (S130). The processor 140 may determine whether to control braking (deceleration) by determining whether the speed obtained by subtracting the target vehicle speed from the current vehicle speed is not less than a predetermined reference vehicle speed (e.g., 3 kph). The processor 140 determines to perform the braking control when the speed difference between the current vehicle speed and the target vehicle speed is not less than the reference vehicle speed; the processor 140 determines not to perform the braking control when the speed difference between the current vehicle speed and the target vehicle speed is less than the reference vehicle speed. The exemplary embodiment of the present invention has been described based on a vehicle speed, but is not limited thereto. The standard of a vehicle speed may be replaced with the standard of deceleration.

The processor 140 calculates the braking demand amount based on the difference between the current vehicle speed and the target vehicle speed when the difference between the current vehicle speed and the target vehicle speed is not less than a reference vehicle speed (S140). The processor 140 may further consider the slope of the road on which a vehicle is located, when calculating the braking demand amount.

The processor 140 determines whether the calculated braking demand amount is less than the maximum regenerative braking possible amount (S150). The processor 140 may determine whether it is possible to follow the target vehicle speed by only the regenerative braking by comparing the calculated braking demand amount with the maximum regenerative braking possible amount. In other words, the processor 140 may determine whether to perform the cooperative control of the regenerative braking and the brake hydraulic braking, based on the comparison result of the braking demand amount and the maximum regenerative braking possible amount. The processor 140 determines that it is possible to follow the target vehicle speed by only the regenerative braking when the braking demand amount is less than the maximum regenerative braking possible amount, and then may determine not to perform the cooperative control of the regenerative braking and the brake hydraulic braking. (i.e., single control of the regenerative braking). In the meantime, the processor 140 determines that it is impossible to follow the target vehicle speed by only the regenerative braking when the braking demand amount is not less than the maximum regenerative braking possible amount, and then may determine to perform the cooperative control of the regenerative braking and the brake hydraulic braking.

When the calculated braking demand amount is less than the maximum regenerative braking possible amount, the processor 140 controls a vehicle speed through the regenerative braking (S160). When it is possible to follow the target vehicle speed with only the regenerative braking, the processor 140 calculates regenerative braking torque corresponding to the calculated braking demand amount and then controls the output torque of the motor 40 based on the calculated regenerative braking torque. The processor 140 may control the vehicle speed to follow the target vehicle speed with only the regenerative braking.

When the calculated braking demand amount is not less than the maximum regenerative braking possible amount, the processor 140 calculates the brake hydraulic braking demand amount (S170). The processor 140 may calculate the brake hydraulic braking demand amount by subtracting the maximum regenerative braking possible amount from the calculated braking demand amount.

The processor 140 controls the vehicle speed to follow the target vehicle speed through the cooperative control of the regenerative braking and the brake hydraulic braking (S180). The processor 140 may control the output torque of the motor 40 by calculating the regenerative braking torque corresponding to the maximum regenerative braking possible amount. Furthermore, the processor 140 may control the brake torque by adjusting the brake hydraulic pressure based on the brake hydraulic braking demand amount.

Figure 5:
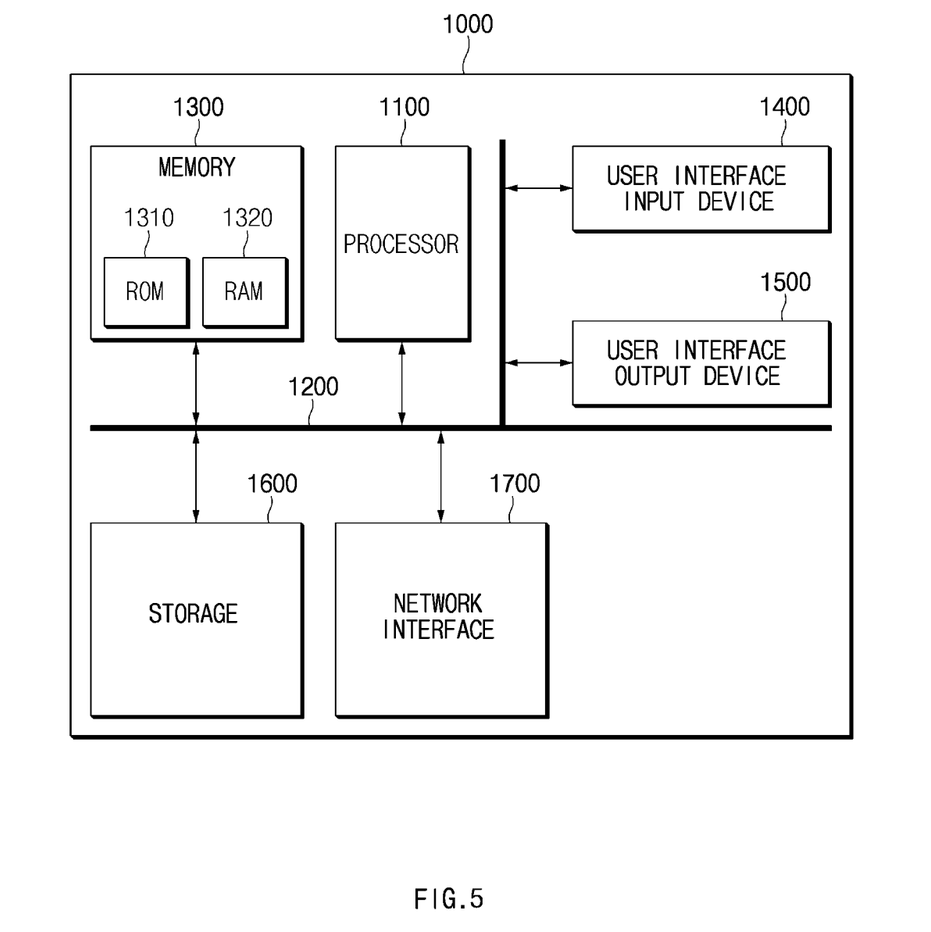
FIG. 5 is a block diagram illustrating a determining system performing a control method of an HEV according to various exemplary embodiments of the present invention.

FIG. 5 is a block diagram illustrating a computing system performing a control method of an HEV according to various exemplary embodiments of the present invention.

Referring to FIG. 5, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims. Therefore, the exemplary embodiments of the present invention are provided to explain the spirit and scope of the present invention, but not to limit them, so that the spirit and scope of the present invention is not limited by the embodiments. The scope of the present invention should be construed on the basis of the accompanying claims, and all the technical ideas within the scope equivalent to the claims should be included in the scope of the present invention.

According to various exemplary embodiments of the present invention, when the DBC is operated, a vehicle speed is controlled by regenerative braking more preferentially than brake hydraulic braking, and thus fuel efficiency may be improved by increasing distance to empty because a high-voltage battery by regenerative braking is capable of being charged.

Furthermore, according to various exemplary embodiments of the present invention, the brake durability may be improved by reducing the brake hydraulic brake amount and frequency of use when the DBC is operated.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A control device of a hybrid electric vehicle (HEV), the control device comprising:
 a processor; and
 a storage connected to the processor and configured to store instructions executed by the processor,
 wherein the processor is configured to:
  determine a target vehicle speed of the HEV based on a shifting gear upon operating a Downhill Brake Control (DBC) function;

determine whether to perform a braking control of the HEV, by comparing a current vehicle speed of the HEV with the target vehicle speed of the HEV;

determine a braking demand amount according to a difference between the current vehicle speed and the target vehicle speed when the braking control is determined to be performed; and control a vehicle speed of the HEV by determining whether to perform cooperative control of a regenerative braking and a hydraulic braking, according to the braking demand amount and a maximum regenerative braking possible amount.

2. The control device of claim 1, wherein the processor is further configured to:

determine whether it is possible for the vehicle speed to reach to the target vehicle speed by using the regenerative braking, by comparing the braking demand amount and the maximum regenerative braking possible amount.

3. The control device of claim 2, wherein the processor is further configured to:

determine regenerative braking single control by determining whether it is possible for the vehicle speed to reach to the target vehicle speed by using the regenerative braking, when the braking demand amount is less than the maximum regenerative braking possible amount.

4. The control device of claim 3, wherein the HEV includes a motor, and wherein the processor is further configured to control output torque of the motor by determining a regenerative braking torque corresponding to the braking demand amount.

5. The control device of claim 2, wherein the processor is further configured to:

determine the cooperative control of the regenerative braking and the hydraulic braking by determining whether it is impossible for the vehicle speed to reach to the target vehicle speed by using the regenerative braking, when the braking demand amount is not less than the maximum regenerative braking possible amount.

6. The control device of claim 5, wherein the HEV includes a brake, and wherein the processor is further configured to:

determine a hydraulic braking demand amount by subtracting the maximum regenerative braking possible amount from the braking demand amount; and control an output torque of the brake by adjusting a brake hydraulic pressure according to the hydraulic braking demand amount.

7. The control device of claim 6, wherein the HEV includes a motor, and wherein the processor is further configured to control an output torque of the motor by determining a regenerative braking torque corresponding to the maximum regenerative braking possible amount.

8. The control device of claim 1, wherein the processor is further configured to:

determine to perform the braking control when the difference between the current vehicle speed and the target vehicle speed is not less than a reference vehicle speed.

9. A method for controlling a hybrid electric vehicle (HEV), the method including:

determining a target vehicle speed of the HEV based on a shifting gear upon operating a Downhill Brake Control (DBC) function;

determining whether to perform a braking control of the HEV, by comparing a current vehicle speed of the HEV with the target vehicle speed of the HEV;

determining a braking demand amount according to a difference between the current vehicle speed and the target vehicle speed when the braking control is determined to be performed; and controlling, by a control device, a vehicle speed of the HEV by determining whether to perform cooperative control of a regenerative braking and a hydraulic braking, according to the braking demand amount and a maximum regenerative braking possible amount.

10. The method of claim 9, wherein the controlling of the vehicle speed includes:

determining whether it is possible for the vehicle speed to reach to the target vehicle speed by using the regenerative braking, by comparing the braking demand amount and the maximum regenerative braking possible amount.

11. The method of claim 10, wherein the controlling of the vehicle speed further includes:

determining the cooperative control of the regenerative braking and the hydraulic braking by determining whether it is impossible for the vehicle speed to reach to the target vehicle speed by using the regenerative braking, when the braking demand amount is not less than the maximum regenerative braking possible amount.

12. The method of claim 11, wherein the HEV includes a brake, and wherein the controlling of the vehicle speed further includes:

determining a hydraulic braking demand amount by subtracting the maximum regenerative braking possible amount from the braking demand amount; and controlling output torque of the brake by adjusting a brake hydraulic pressure according to the hydraulic braking demand amount.

13. The method of claim 12, wherein the HEV includes a motor, and wherein the controlling of the vehicle speed further includes:

controlling an output torque of the motor by determining a regenerative braking torque corresponding to the maximum regenerative braking possible amount.

14. The method of claim 10, wherein the controlling of the vehicle speed further includes:

determining a regenerative braking single control by determining whether it is possible for the vehicle speed to reach to the target vehicle speed by using the regenerative braking, when the braking demand amount is less than the maximum regenerative braking possible amount.

15. The method of claim 14, wherein the HEV includes a motor, and wherein the controlling of the vehicle speed further includes controlling an output torque of the motor by determining a regenerative braking torque corresponding to the braking demand amount.

16. The method of claim 9, wherein the determining of whether to perform the braking control includes:

determining to perform the braking control when the difference between the current vehicle speed and the target vehicle speed is not less than a reference vehicle speed.

17. The method of claim 9, wherein the control device includes:
a processor; and
a non-transitory storage medium on which a program for performing the method of claim 9 is recorded and executed by the processor.

* * * * *